United States Patent
Ueda et al.

(10) Patent No.: US 7,482,079 B2
(45) Date of Patent: Jan. 27, 2009

(54) FUEL CELL SYSTEM AND METHOD OF CONTROLLING A FUEL DISCHARGING PROCESS BASED ON THE FUEL CELL OUTPUT VOLTAGE

(75) Inventors: Kenichiro Ueda, Saitama (JP); Yosuke Fujii, Saitama (JP); Yoshikazu Murakami, Saitama (JP); Yuji Matsumoto, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 436 days.

(21) Appl. No.: 11/076,364

(22) Filed: Mar. 7, 2005

(65) Prior Publication Data

US 2005/0196655 A1 Sep. 8, 2005

(30) Foreign Application Priority Data

Mar. 5, 2004 (JP) ............................. 2004-061935

(51) Int. Cl.
*H01M 8/04* (2006.01)
(52) U.S. Cl. .......................................... 429/22; 429/13
(58) Field of Classification Search ................... 429/13, 429/22

See application file for complete search history.

(56) References Cited

U.S. PATENT DOCUMENTS 6,106,964 A * 8/2000 Voss et al. .................... 429/20

FOREIGN PATENT DOCUMENTS

JP 11-097047 4/1999

* cited by examiner

*Primary Examiner*—Mark Ruthkosky
(74) *Attorney, Agent, or Firm*—Lahive & Cockfield, LLP; Anthony A. Laurentano, Esq.

(57) ABSTRACT

A fuel cell system has a fuel cell, a fuel supply device, a gas discharge valve, a voltage detecting device and a control device. The fuel supply device supplies a fuel gas to the fuel cell. The gas discharge valve discharges the fuel gas into an external environment. The voltage detecting device detects an output voltage of the fuel cell. The control device controls a discharging process when a request for starting the fuel cell is given. The discharging process includes introducing the fuel gas from the fuel supply device into a predetermined passage, opening the gas discharge valve and discharging residuals staying in the passage into the external environment. When the control device receives the request and determines that the output voltage has reached a first threshold before the discharging process has not been completed, the control device starts power generation irrespective of completion of the discharging process.

6 Claims, 3 Drawing Sheets

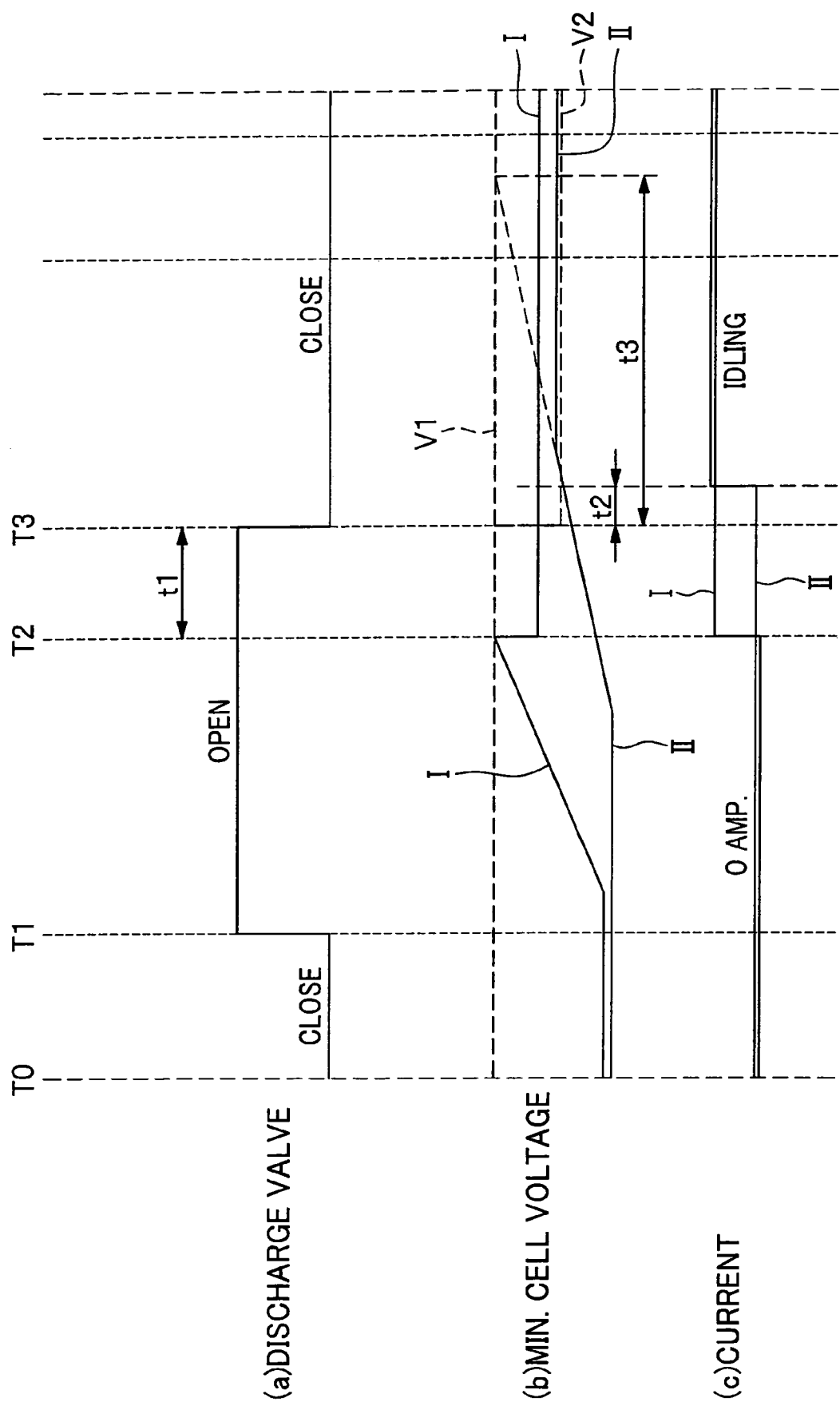

FUEL CELL SYSTEM AND METHOD OF CONTROLLING A FUEL DISCHARGING PROCESS BASED ON THE FUEL CELL OUTPUT VOLTAGE

BACKGROUND OF THE INVENTION

The present invention relates to a fuel cell system which starts power generation of a fuel cell after removing impurities remaining in a fuel gas passage when the fuel cell is brought into operation, and a method of controlling the fuel cell system.

A fuel cell of solid polymer type has stacked structure of some tens to some hundreds layers of unit cells. Each unit cell includes electrically conductive separators sandwiching a Membrane Electrode Assembly (MEA), which has a hydrogen electrode and an oxygen electrode that together interpose an electrolytic membrane. When power generation is stopped, it is generally practiced in a fuel cell system having a fuel cell of this type that supply of a hydrogen gas (fuel gas) is terminated and a gas discharge valve provided at an outlet of hydrogen discharge passage is closed. When it has lapsed much time before starting power generation, it sometimes occurs that air (cathode gas) of the oxygen electrode permeates through the electrolytic membrane, staying around the hydrogen electrode in the fuel cell. Furthermore, replacement of a gas remaining in a fuel cell with an inert gas such as a nitrogen gas is sometimes conducted during termination of power generation. If this is adopted, it will be necessary to discharge impurities such as a nitrogen gas remaining in a fuel cell into an external environment when the fuel cell is brought to operation. Related techniques are disclosed in Japanese Published Patent Application 11-97047.

This patent document discloses an invention that a remaining inert gas is discharged by conducting steps, such as supplying air to a fuel cell after opening a hydrogen control valve and subsequently opening a hydrogen discharge valve. It also discloses a control method that power generation is started by closing the hydrogen discharge valve if a monitored output voltage of the fuel cell has reached no less than a threshold or a predetermined volume of hydrogen gas (anode gas) has been discharged.

However, the technique disclosed in the patent document, which introduces power generation by closing the hydrogen discharge valve when the output voltage of the fuel cell has reached the threshold, has a drawback that it is difficult to implement stable power generation. This drawback is ascribed to the fact that a fuel cell, whose rate of voltage rise is higher for example, probably has a large amount of impurities in a hydrogen gas passage when an output voltage of the fuel cell has reached a threshold in spite of insufficient discharging with a hydrogen gas. Namely, because the unconsumed impurities remain at a hydrogen electrode, it is difficult to provide stable power generation. On the other hand, when an output voltage of a fuel cell, which slowly rises, has difficulty in reaching a threshold even after completion of discharging of impurities, a fuel cell system tends to keep discharging a hydrogen gas until the output voltage has reached the threshold, which results in wasteful consumption of fuel.

A technique, in which completion of predetermined volume of a hydrogen gas triggers start of power generation, does not initiate power generation even if the output voltage of a fuel cell has risen sufficiently, which has raised a problem that it takes too much time in starting the fuel cell.

SUMMARY OF THE INVENTION

The present invention, which seeks to solve the problems described above, provides a fuel cell system which is able to shorten time required for starting a fuel cell, to provide stable power generation and to prevent wasteful consumption of fuel. The present invention also provides a method of controlling the fuel cell system.

It is an aspect of the present invention to provide a fuel cell system comprising a fuel cell, a fuel supply device, a gas discharge valve, a voltage detecting device and a control device. The fuel supply device supplies a fuel gas to the fuel cell. The gas discharge valve discharges the fuel gas, which is supplied to the fuel cell, into an external environment. The voltage detecting device detects an output voltage of the fuel cell. The control device controls a discharging process when a request for starting the fuel cell is given, wherein the discharging process comprises introducing the fuel gas from the fuel supply device into a predetermined passage, opening the gas discharge valve and discharging residuals staying in the passage into the external environment. When the control device receives the request and determines that the output voltage has reached a first threshold before the discharging process has not been completed, the control device starts power generation of the fuel cell irrespective of completion of the discharging process.

The fuel cell system described above, which starts power generation prior to completion of discharging with the fuel gas based on the output voltage of fuel cell, provides a reduction in time required for starting the fuel cell. In addition, because the discharging continues after starting of power generation, it is possible to expel impurities securely, which leads to stable power generation with a fuel gas of higher purity.

It is preferable but not necessarily required that when the control device determines at completion of the discharging process that the output voltage has not reached the first threshold, the control device replaces the first threshold with a second threshold which is lower than the first threshold and proceeds to starting power generation of the fuel cell when the output voltage has reached the second threshold.

The fuel cell system described above is able to provide protection against a malfunction that the system does not proceed to starting of power generation when the output voltage increases slowly. Furthermore, because the system does not continue discharging a fuel gas for an unnecessarily long period of time, it is possible to increase fuel efficiency as a result of avoiding wasteful consumption of fuel.

BRIEF DESCRIPTION OF THE DRAWINGS

FIG. 3 is a time chart showing timing for switching of thresholds and operation of a hydrogen discharge valve.

DESCRIPTION OF THE PREFERRED EMBODIMENTS

Figure 1:
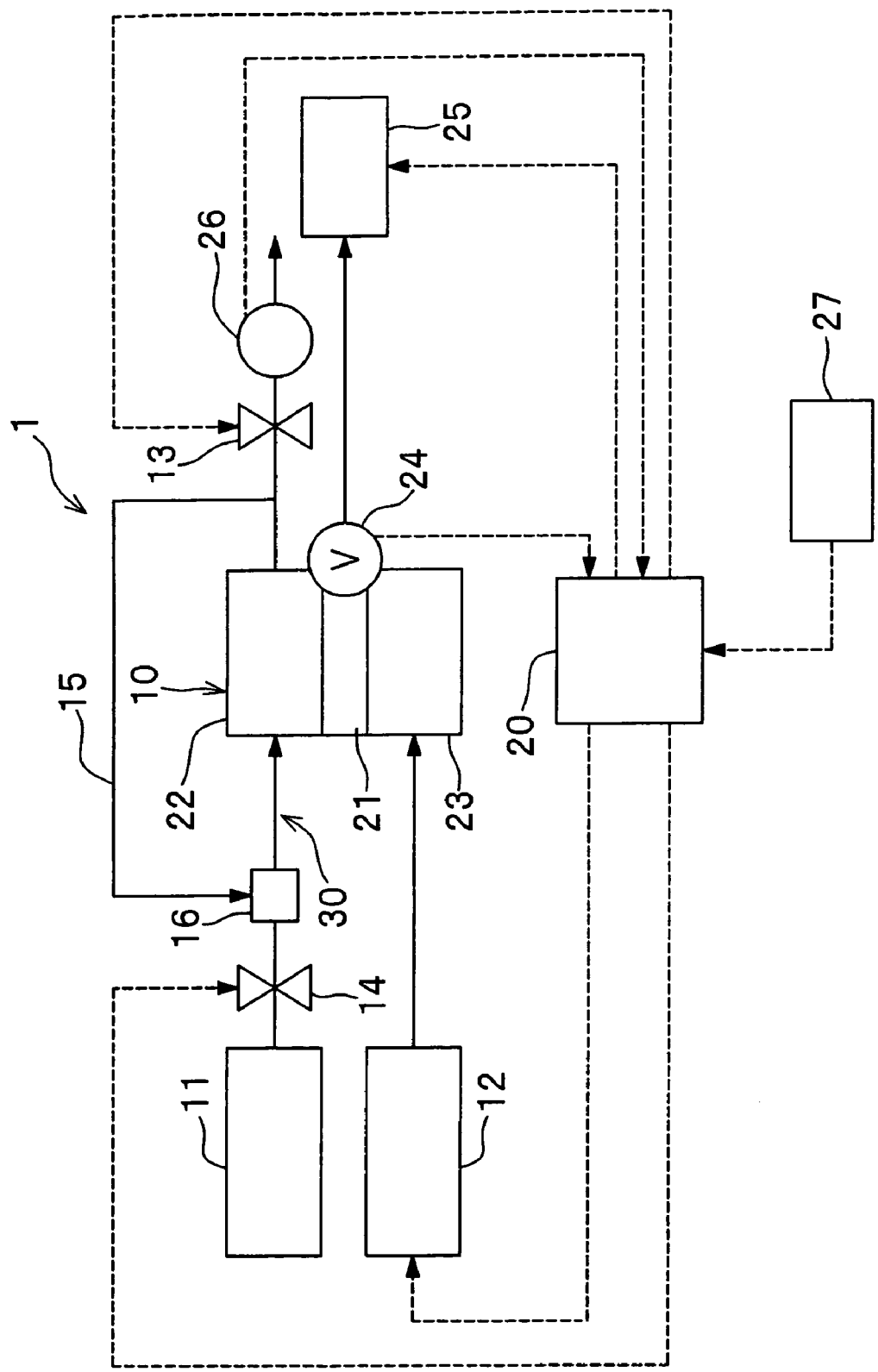
FIG. 1 is a block diagram showing overall structure of a fuel cell system according to the present invention.

An embodiment of the present invention is now described with reference to the accompanying drawings.

Though description is given of a fuel cell system which is mounted on a vehicle (not shown) as an example, it goes without saying that it is possible to adopt other types of application.

A fuel cell system 1 includes a fuel cell 10, a hydrogen supply device (fuel supply device) 11 and a discharge valve (gas discharge valve) 13. The fuel cell 10 is connected with a passage 30 for supplying a hydrogen gas. The hydrogen supply device 11 is disposed upstream and the discharge valve 13 downstream each relative to the fuel cell 10. The discharge valve 13 controls discharging of a hydrogen gas out of the passage 30. The fuel cell system 1 also includes a voltage sensor (voltage detecting device) 24, a flow meter 26 and an air supply device 12. The voltage sensor 24 monitors an output voltage of the fuel cell 10. The flow meter 26 monitors a flow rate of a gas discharged via the discharge valve 13. The air supply device 12 supplies air (oxygen gas) to the fuel cell 10. A control valve 14 for controlling a hydrogen gas, which is supplied by the hydrogen supply device 11, is connected with the passage 30.

The fuel cell 10 has a plurality of unit cells which is stacked in a direction of the thickness of a membrane electrode assembly (MEA). A unit cell has electrically conductive separators (not shown) sandwiching an MEA, in which an anode (hydrogen electrode) 22 and a cathode (oxygen electrode) 23 each including a catalyst interpose a solid polymer electrolytic membrane 21 having ionic conductance. A separator, which has a hydrogen gas passage, air (oxygen gas) passage and coolant passage, is supplied with a hydrogen gas from the hydrogen supply device 11, air from the air supply device 12 and a coolant from a coolant circulating device (not shown), respectively. These fluids do not mix when they are supplied via the passages.

When a hydrogen gas is supplied to the anode 22 from the hydrogen supply device 11 and air to the cathode 23 from the air supply device 12, the hydrogen gas and oxygen gas in the air make an electrochemical reaction, increasing a cell voltage of the fuel cell 10. If a current is extracted from the fuel cell 10, its power generation will start. The current is supplied to a load 25, such as a traction motor, air compressor and the like.

In order to recycle an unreacted hydrogen gas discharged from the fuel cell, the fuel sell system 1 uses a circulation passage 15 and an ejector 16. The circulation passage 15 is disposed between the discharge valve 13 and the hydrogen supply device 11. The ejector 16 enables circulation of a hydrogen gas via the circulation passage 15. The unreacted hydrogen gas is discharged from the fuel cell 10 when the current is not extracted from the fuel cell 10. Because a hydrogen gas supplied by the hydrogen supply device 11 has high purity, its recycling is implemented so as to prevent wasteful fuel consumption. If impurities exist, this recycling adversely works, letting them stay inside the fuel cell system 1. In this connection, air which is supplied to the fuel cell 10 by the air supply device 12 but not used for power generation, and water produced by an electrochemical reaction between a hydrogen gas and air (oxygen gas), are discharged via a discharge port (not shown).

The fuel cell system 1 according to the present embodiment has a control device 20, which includes CPU, memories and input-output interfaces. When the control unit 20 sends an electrical signal to the control valve 14, the hydrogen supply device 11 supplies a hydrogen gas to the fuel cell 10. When the control unit 20 similarly sends an electrical signal to the air supply device 12, the air supply device 12 adjusts an amount of air supplied to the fuel cell 10. The control device 20 also controls opening and closing of the discharge valve 13 as well as the current supplied to the load 25. Counting time, a timer 27 sends time signals to the control device 20, to which the timer 27 is electrically connected.

Furthermore, the control device 20 monitors an output voltage obtained by the voltage sensor 24 and a flow rate of hydrogen gas obtained by the flow meter 26, which is discharged into an external environment via the discharge valve 13.

In this embodiment, the output voltage of the fuel cell 10 is meant to represent a minimum value (minimum cell voltage) which is selected out of all the voltages of unit cells. Selection of the minimum cell voltage as a control reference prevents a deteriorating unit cell from experiencing an excessive load. It may be alternatively possible to select an average voltage or maximum voltage instead of the minimum cell voltage. The total number of unit cells included in the fuel cell 10 is not limited but can be arbitrarily adopted.

Next, operation of a fuel cell system according to the present invention is described with reference to FIG. 2.

Figure 2:
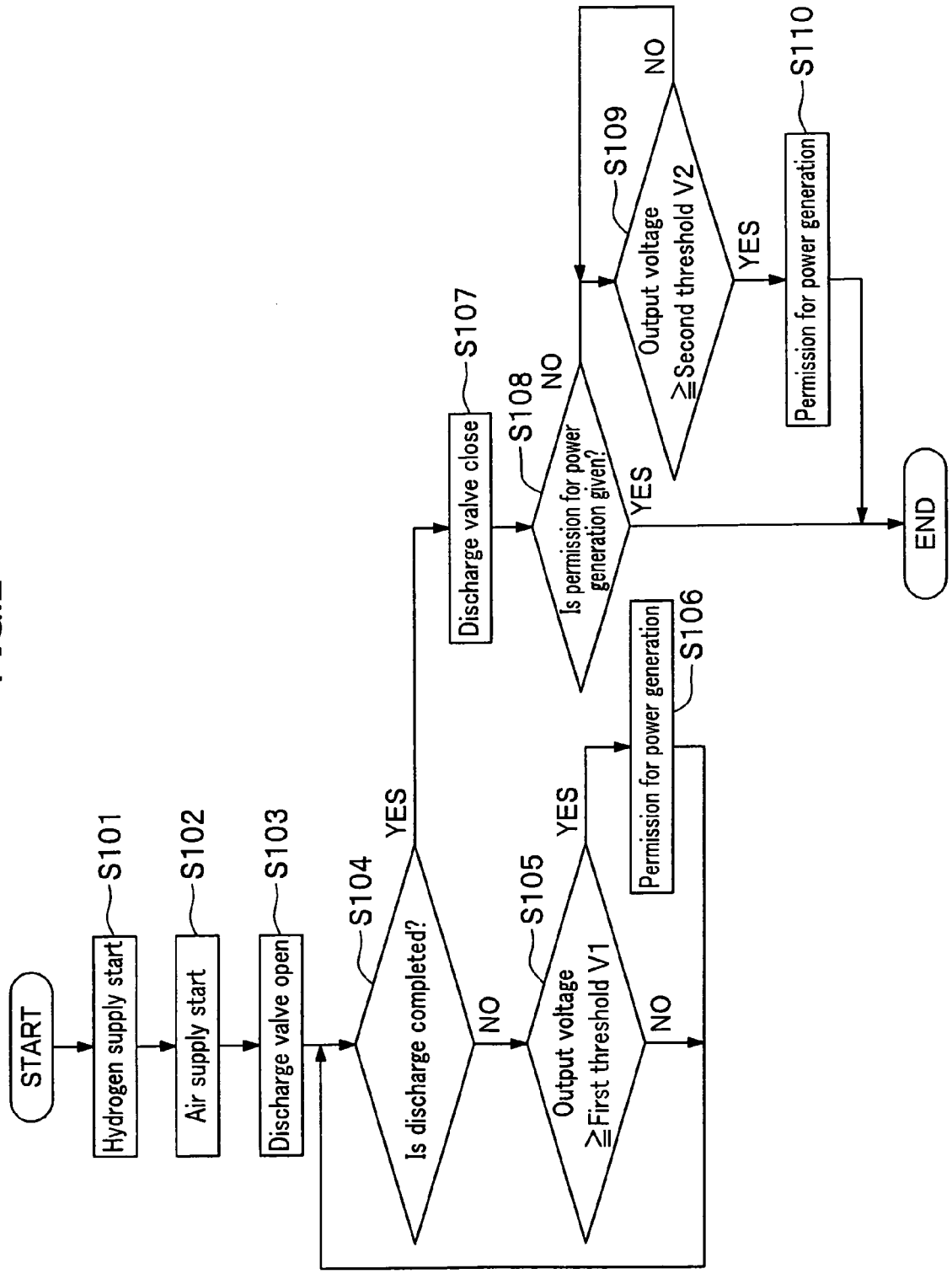
FIG. 2 is a flow chart showing steps of discharging.

As shown in FIG. 2, when a request for starting a fuel cell 10 is given, a control device 20 sends a signal so as to open a control valve 14, starting supply of a hydrogen gas from a hydrogen supply device 11 (step S101). Receiving a signal from the control device 20, an air supply device 12 starts supply of air to the fuel cell 10 (step S102). The control device 20 opens a discharge valve 13 (step S103), so that residuals staying in a passage 30 during the termination of the fuel cell 10 is discharged. The residuals include air or a residual gas. Permeating a solid polymer electrolytic membrane 21, the air intrudes into an anode 22 from a cathode 23 while the fuel cell 10 is stopped. The residual gas is produced as a result of replacement of a gas existing in the passage 30 with an inert gas such as a nitrogen gas when a request for termination of the fuel cell 10 is given.

The control device 20 determines whether or not a predetermined amount of hydrogen gas (anode gas) has been discharged (step S104). This determination is conducted based on a predetermined time, which is calculated in advance and incorporated into a timer 27 (see FIG. 1) electrically connected to the control device 20. When the timer 27 counts up the predetermined time, the control device 20 determines that the predetermined amount of hydrogen gas has been discharged and closes the discharge valve 13 so as to finish discharging. The predetermined time period meant to be a time required for discharging one of volume of the anode 22 in the fuel cell 10 and volume of the passage 30 including the fuel cell 10. It may be alternatively possible to determine completion of discharging a hydrogen gas based on a signal generated by a flow meter 26, which monitors a flow rate of gas discharged via the discharge valve 13.

If the control device 20 determines that discharging has not been completed (NO in step S104), the control device 20 moves on to step S105, determining whether or not a minimum cell voltage of the fuel cell 10 has reached a first threshold V1. If the control device 20 determines that the minimum cell voltage has not reached the first threshold V1, the flow returns to step S104. On the other hand, if the control device 20 determines that the minimum cell voltage has reached the first threshold V1 (YES in step S105), the control device 20 starts power generation by extracting current from the fuel cell 10 (step S106). When the current is extracted, the reaction between a hydrogen gas and an oxygen gas will develop.

The operation described above, which starts power generation earlier prior to completion of discharging with a hydrogen gas as long as the control device 20 determines that the minimum cell voltage has reached the first threshold V1, can decrease time required for starting a fuel cell system 1. It is noted that if power generation is started earlier, it is possible to enhance warm-up with heat dissipated by cells, which is especially advantageous for a vehicle used in a cold district.

If the control device 20 determines that the predetermined amount of hydrogen gas has been discharged based on a lapse of the predetermined time in step S104, the control device 20 closes the discharge valve 13 (step S107), completing discharging process. In step S108, the control device 20 determines whether or not power generation has been started. If the minimum cell voltage has reached the first threshold V1 and power generation has been already started (YES in step S108), the flow completes (END in FIG. 2). The control device 20 continues controlling the fuel cell system 1 so as to conduct power generation.

If the control device 20 determines that the minimum voltage has not reached the first threshold V1 and power generation has not been started (NO in step S108), the control device 20 replaces the first threshold V1 with a second threshold V2, which is lower than V1, and monitors if the minimum voltage has reached the second threshold V2. When the minimum voltage has reached the second threshold V2 (YES in step S109), the control device 20 starts power generation (S110), finishing discharging process (END in FIG. 2).

The fuel sell system 1 described above, which replaces the first threshold V1 with the second threshold V2 when the minimum cell voltage has not reached the first threshold V1 while discharging with a hydrogen gas has been completed, has provision for encouraging a transition to power generation of the fuel cell 10. In this way, the fuel cell system 1 prevents a malfunction that it takes too much time to start power generation. In addition, because the fuel cell system 1 does not keep the discharge valve 13 open so as to discharge a hydrogen gas out of the passage 30, it is possible to avoid the wasteful discharge of hydrogen gas when discharging of impurities is completed. In this way, the fuel cell system 1 provides protection against wasteful consumption of fuel, increasing fuel efficiency. Furthermore, the fuel cell system 1 keeps the purity of a hydrogen gas in the passage 30 higher, thereby providing stable power generation.

Description is given of operation of a fuel cell system according to the present invention with reference to a time chart shown in FIG. 3. In FIG. 3, symbol (a) stands for the status of a discharge valve, open or close. Symbol (b) represents the history of minimum cell voltages: symbol I is for a case of high rate of voltage rise and symbol II for a case of low rate of voltage rise. Symbol (c) represents the history of generated currents corresponding to (b). FIGS. 1 and 2 will be referred if they are necessary.

First, description is given of a case where the rate for voltage rise of a fuel cell 10 is higher as shown in FIG. 3 with a symbol I. When a request for starting the fuel cell 10 is given to a fuel cell system 1 at time T0 (=0), the system 1 starts supplying a hydrogen gas and air to the fuel cell 10 (see steps S101-S102 in FIG. 2). At this time, as a discharge valve 13 is not open, only a pressure rise occurs in a passage 30. In this way, residuals are not forced to discharge into an external environment, so that both minimum cell voltage shown in (b) and generated current shown in (c) are substantially equal to zero. When the discharge valve 13 is opened after a lapse of time T1 relative to time T0 (S103), the residuals in a passage 30 are forced to discharge via the discharge valve 13, so that the minimum cell voltage starts to rise at time T1. The reason for the rise of voltage is that the concentration of a hydrogen gas becomes higher as a result of discharging the residuals. After a lapse of time T2, the minimum cell voltage reaches a first threshold V1. Although discharging has been not completed at this time (S104), the fuel cell system 1 gives a permission to start power generation of the fuel cell 10 (S106) based on the determination given in step S105. In this way, the fuel cell system 1 starts power generation and current extraction as shown by (c) in FIG. 3 (S106). Although the minimum cell voltage experiences some drop due to I-V characteristics of the fuel cell 10 at time T2, it subsequently keeps substantially constant value, because a constant current is extracted during a subsequent idling condition.

As described above, when the fuel cell system 1 determines that the minimum cell voltage has reached the first threshold V1 although the discharge valve is not closed and discharging has not been completed, it immediately starts power generation. Furthermore, the fuel cell system 1 conducts discharging for a period of time t1 (T3−T2) before completing discharging. Because the fuel cell system 1 does not finish discharging so as not to leave discharging of the residuals in the fuel cell 10 incomplete, it provides stable power generation from an earlier stage of starting of the fuel cell 10. When the fuel cell system 1 is used in a cold district, its warm-up is accelerated, because it is possible to earlier start power generation, which produces heat resulting from an electrochemical reaction.

In contrast to the case described above, there is a case where the rate for voltage rise of a fuel cell 10 is lower as shown in FIG. 3 with a symbol II. It possibly happens that even if the discharge valve 13 is opened and a hydrogen gas and air are discharged (S101−S103), the minimum cell voltage keeps taking a value smaller than the first threshold V1. If this happens, the fuel cell system 1 replaces the first threshold V1 with a second threshold V2, which is smaller than V1, when discharging has been completed with the discharge valve 13 closed, which occurs after a lapse of time T3. Replacement with the smaller threshold V2 makes it possible to start power generation earlier for the case where the minimum cell voltage increases slowly. For example as shown in (b) of FIG. 3 with a broken line, if the replacement is not adopted, it takes a period of time t3 relative to time T3 to start power generation. In the case of the present invention which adopts the replacement, it is possible to shorten the period of time t3 to t2. In this way, the fuel cell system 1 provides a protection against a malfunction that it takes too much time to start power generation when the minimum cell voltage increases slowly due to deterioration of a cell. Because it is not necessary to keep the discharge valve 13 open until power generation starts, the fuel cell system 1 is able to prevent worsening of fuel efficiency. Furthermore, when the fuel cell system 1 is used in a cold district, its warm-up is accelerated.

The fuel cell system 1 according to the present invention does not determine a start of power generation based on a predetermined volume (amount) of discharged hydrogen gas as is disclosed in JP 11-97047. For this reason, the fuel cell system 1 is able to prevent a malfunction that starting of power generation is unnecessarily delayed although a minimum cell voltage has increased fast to be satisfactory for generating power.

When a minimum cell voltage has reached the second threshold V2, the fuel cell system 1 starts to extract current from the fuel cell 10. Subsequently, the fuel cell system 1 extracts a constant current from the fuel cell 10, so that the minimum cell voltage is kept constant.

It is noted that it is not mandatory to synchronize the timing for replacement of the first threshold V1 by the second threshold V2 with time T3, at which the discharge valve 13 is closed and discharging has been completed. It may be alternatively possible to make the replacement prior to time T3.

While the invention has been described in detail and with reference to specific embodiments thereof, it will be apparent to one skilled in the art that various changes and modifications can be made therein without departing from the spirit and scope thereof. Although description has been given of a fuel cell system mounted on a vehicle as an example, its various types of application may be possible, such as a fuel cell system mounted on means of transportation, a ship or airplane, and a stationary fuel cell system.

A fuel cell has the same I-V characteristics as that of other general batteries. An output voltage of the fuel cell drops as the extracted current increases, or its output voltage rises as the extracted current decreases. This is the reason why a drop of output voltage appears at the start of power generation as described above (see (b) in FIG. 3). If the drop is too great to be acceptable, it may be possible for a control device to decrease or suspend current extraction, which will restore the output voltage. It may also be possible to store an I-V table (map) in a control device, which defines relationship between current and voltage for a healthy fuel cell. The control device determines whether or not power generation of a fuel cell is stable based on comparison between monitored data and the table. In this way, it may be possible for the control device to suspend power generation or to decrease current extraction. For example, it may be possible to introduce chopper control for limiting current extraction. It goes without saying that the control device is adapted to resume power generation if the output voltage has recovered.

Foreign priority document, JP 2004-061935 filed on Mar. 5, 2004, is hereby incorporated by reference.

What is claimed is:

1. A fuel cell system comprising:
   a fuel cell;
   a fuel supply device for supplying a fuel gas to the fuel cell;
   a gas discharge valve for discharging the fuel gas, which is supplied to the fuel cell, into an external environment;
   a voltage detecting device for detecting an output voltage of the fuel cell; and
   a control device programmed to control a discharging process when a request for starting the fuel cell is given;
   wherein when the control device receives the request and determines that the output voltage has reached a first threshold before the discharging process has been completed, the control device staffs power generation of the fuel cell irrespective of completion of the discharging process.

2. A fuel cell system according to claim 1, wherein when the control device determines at completion of the discharging process that the output voltage has not reached the first threshold, the control device replaces the first threshold with a second threshold which is lower than the first threshold and proceeds to starting power generation of the fuel cell when the output voltage has reached the second threshold.

3. A fuel cell system according to claim 1, wherein when a time required for discharging a volume of fuel from a predetermined passage during the discharging process has lapsed, the control device determines that the discharging process has been completed.

4. A fuel cell system according to claim 1, wherein the first threshold serves as a criterion based on which starting of power generation of the fuel cell prior to completion of the discharging process is determined.

5. A fuel cell system according to claim 1, wherein the second threshold serves as a criterion based on which starting of power generation of the fuel cell subsequent to completion of the discharging process is determined.

6. A method for controlling a fuel cell system, which comprises a fuel cell, a fuel supply device, a gas discharge valve, a voltage detecting device and a control device, the method comprising the steps of:
   supplying a fuel gas to the fuel cell by the fuel supply device;
   discharging the fuel gas, which is supplied to the fuel cell, into an external environment by controlling the gas discharge valve;
   detecting an output voltage of the fuel cell by the voltage detecting device; and
   controlling a discharging process by the control device when a request for starting the fuel cell is given, wherein the discharging process comprises opening the gas discharge valve and discharging residuals staying in a predetermined passage into the external environment;
   wherein the discharging process of discharging the residuals into the external environment is completed after a predetermined time; and
   wherein when the control device receives the request and determines that the output voltage has reached a first threshold before the discharging process has been completed, the control device starts power generation of the fuel cell irrespective of completion of the discharging process.

* * * * *